US011947066B2

(12) United States Patent
Lawie et al.

(10) Patent No.: US 11,947,066 B2
(45) Date of Patent: Apr. 2, 2024

(54) FIT FOR PURPOSE MEASUREMENT SYSTEM FOR DRILL HOLE LOGGING

(71) Applicant: REFLEX INSTRUMENTS ASIA PACIFIC PTY LTD, Balcatta (AU)

(72) Inventors: David Charles Lawie, Ashgrove (AU); Christopher Thomas Koplan, Atascadero, CA (US); John Carl Jackson, Ashgrove (AU); Cory Bryce Wilson, Atascadero, CA (US); Joel Hitchen, Atascadero, CA (US); Christopher Pell, Atascadero, CA (US); Frederick Blaine, Innaloo (AU); Erik Gutterud, Grover Beach, CA (US)

(73) Assignee: REFLEX INSTRUMENTS ASIA PACIFIC PTY LTD, Balcatta (AU)

( * ) Notice: Subject to any disclaimer, the term of this patent is extended or adjusted under 35 U.S.C. 154(b) by 0 days.

(21) Appl. No.: 17/781,951

(22) PCT Filed: Dec. 1, 2020

(86) PCT No.: PCT/AU2020/051305
§ 371 (c)(1),
(2) Date: Jun. 2, 2022

(87) PCT Pub. No.: WO2021/108847
PCT Pub. Date: Jun. 10, 2021

(65) Prior Publication Data
US 2023/0025415 A1    Jan. 26, 2023

Related U.S. Application Data

(60) Provisional application No. 62/942,353, filed on Dec. 2, 2019.

(51) Int. Cl.
*G01V 11/00* (2006.01)
*E21B 47/08* (2012.01)
(Continued)

(52) U.S. Cl.
CPC ............ *G01V 11/005* (2013.01); *E21B 47/08* (2013.01); *G01V 3/28* (2013.01); *G01V 5/04* (2013.01)

(58) Field of Classification Search
None
See application file for complete search history.

(56) References Cited

U.S. PATENT DOCUMENTS 3,890,563 A    6/1975 Dowling et al.
4,914,826 A *  4/1990 Nold, III ............... E21B 47/08
                                          33/544.3
(Continued)

FOREIGN PATENT DOCUMENTS

GB    2294074 A      4/1996
WO    2012/068629 A1 5/2012

OTHER PUBLICATIONS

Australian Patent Office, International Search Report issued in corresponding Application No. PCT/AU2020/051305, dated Feb. 11, 2021.
(Continued)

*Primary Examiner* — Douglas X Rodriguez
(74) *Attorney, Agent, or Firm* — Stites & Harbison, PLLC; Terry L. Wright

(57) ABSTRACT

A drill hole logging system (5) incorporates a computing system (58) at the surface and a deployment mechanism (40) for conveying a logging tool (10) configured to measure one or more geophysical parameters into a drill hole (20). A transmission means (57) communicates commands and data representing the geophysical parameters between the surface computing system and the logging tool. A borehole caliper (300) is employed to profile the inside of the borehole.

20 Claims, 14 Drawing Sheets

(51) Int. Cl.
*G01V 3/28* (2006.01)
*G01V 5/04* (2006.01)

(56) References Cited

U.S. PATENT DOCUMENTS

| | | |
|---|---|---|
| 7,389,828 B2 | 6/2008 | Ritter et al. |
| 8,612,084 B2* | 12/2013 | Hennessy ............ G05D 1/0278 342/36 |
| 2006/0064889 A1 | 3/2006 | Fredette et al. |
| 2006/0091307 A1* | 5/2006 | Griffiths ................. G01V 5/045 250/262 |
| 2013/0239673 A1 | 9/2013 | Garcia-Osuna et al. |
| 2014/0059874 A1 | 3/2014 | Sallwasser |
| 2015/0323697 A1* | 11/2015 | Ohmer .................... E21B 47/08 324/333 |
| 2016/0025892 A1 | 1/2016 | Sinclair et al. |

OTHER PUBLICATIONS

Australian Patent Office, International Preliminary Report on Patentability issued in corresponding Application No. PCT/AU2020/051305, dated Mar. 18, 2022.

* cited by examiner

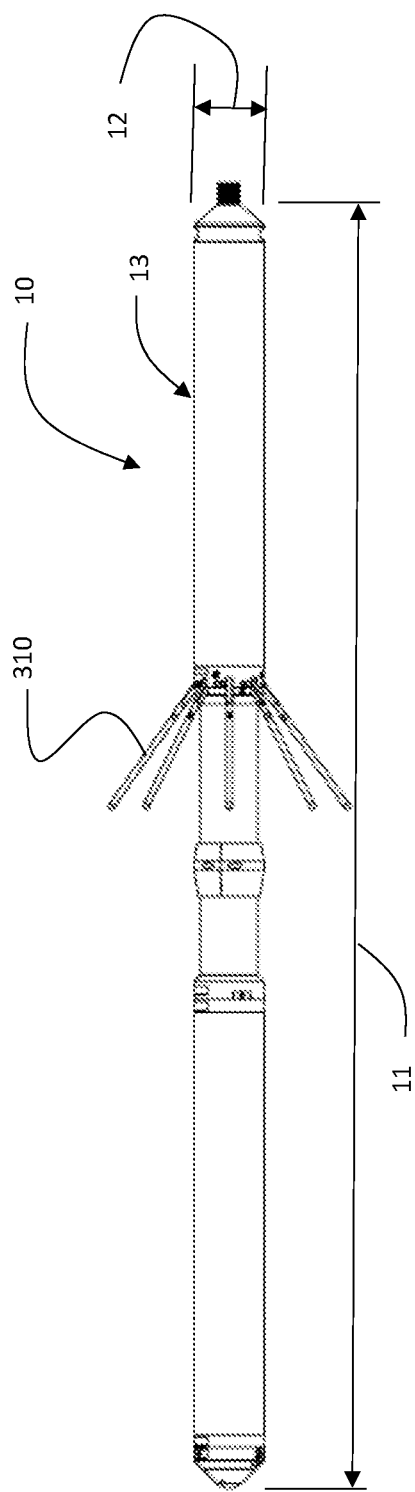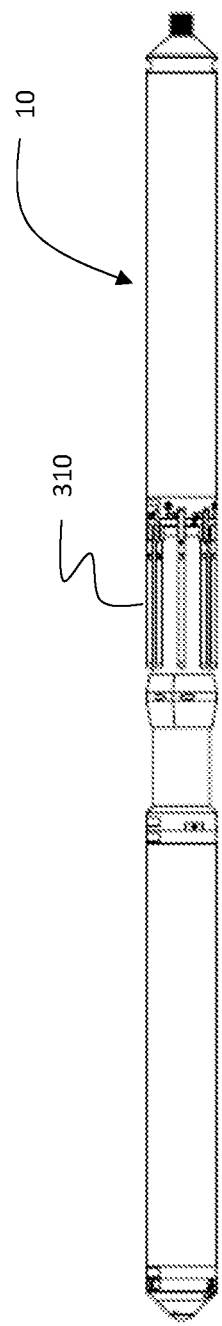
Figure 2
Figure 3

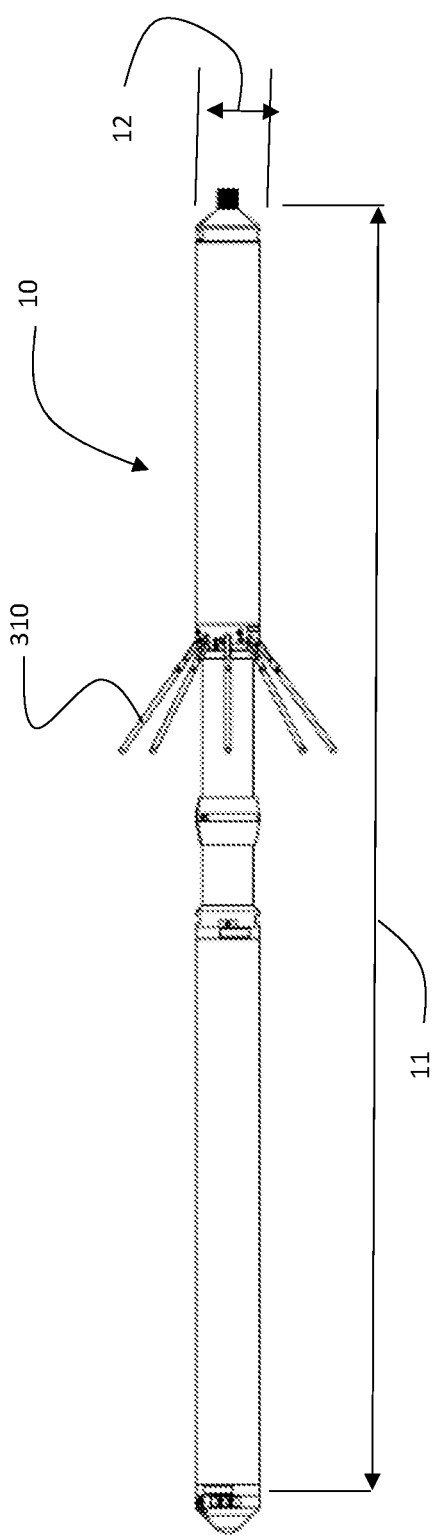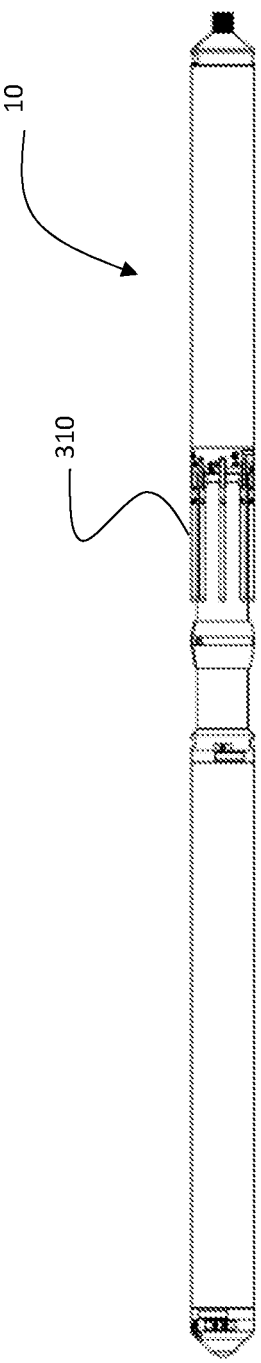
Figure 5
Figure 6

FIT FOR PURPOSE MEASUREMENT SYSTEM FOR DRILL HOLE LOGGING

REFERENCE TO RELATED APPLICATIONS

This application claims priority of U.S. provisional application Ser. No. 62/942,353 entitled FIT FOR PURPOSE MEASUREMENT SYSTEM FOR BLAST HOLE LOGGING filed on Dec. 2, 2019, the disclosure of which is incorporated herein by reference. This application is copending with U.S. provisional application Ser. No. 62/942,360 entitled MAGNETIC SUSCEPTIBILITY AND CONDUCTIVITY TOOL filed on Dec. 2, 2019 which is the priority for a PCT application filed substantially concurrently herewith having International Application No. PCT/AU2020/051037, the U.S. national stage entry of which is U.S. patent application Ser. No. 17/781,889, and which is now U.S. Pat. No. 11,754,739, the disclosure of which is incorporated herein by reference.

BACKGROUND INFORMATION

Field

The present invention relates generally to blast hole logging systems and more particularly to implementations for a modular drill hole logging tool and a system for deployment and retrieval of the tool.

Background

The ability to access and/or remove rock from a formation or area of interest in a timely and efficient manner is increasingly important in many areas of industry, including mineral, construction and quarrying. Thus, in the field of mining, minerals of various types are extracted from the earth by blasting the rock in an area of interest and processing the rock that is fragmented by the blast. A desirable mining process is to blast such that the rock in the areas of interest that contains a high mineral content or the formation is well fragmented for easier processing while rock of low mineral content or overburden, being waste rock, is identified so that it may be blasted to a different size to optimize disposal and/or sorting. For example, rock with high grade mineral content might be finely fragmented for efficient processing through the crusher while waste rock may be left a larger size as it will not be processed through the crusher and can be readily sorted out from the higher grade mineral rock.

Typically, the mineral concentrations in the area of interest are estimated by a block geological model that is representative of the bench. This model is created from the logging of boreholes that have been drilled across the bench and/or into the formations or the area of interest in which mining is anticipated. From this logging data a block geological model of the formation or area of interest is created. Borehole logging tools are available from companies such as Mount Sopris instruments and W&R Instruments among others. The data from these tools can then be used to assist in creating and/or updating these block geological models.

Further, these models can be spatially coarse estimates of the areas of interest or mineral concentrations in the bench resulting in significant uncertainty in the location of the areas of interest or minerals of interest. Similarly, the structure of the rock in the block geological model may be of a resolution that results in large uncertainties in the structure. These geological uncertainties can reduce the effectiveness of the blasting due to mischaracterization of the structure and hardness of the rock that is to be blasted. Additionally, if the boreholes are not properly logged the boreholes can be incorrectly loaded with explosives, resulting in, for example, nitric oxide fume formation in water logged holes, undetonated explosives remaining in the blast hole or in other circumstances unexploded explosives firing into the air due to incorrect stemming of the bore hole due to incorrect logging of the length. All of these hazards result from mischaracterization of the actual bore hole. The rock processing efficiency can also be reduced due to misidentification of areas of high mineral concentration and waste rock. This in turn leads to overall cost increases, and reduced efficiencies.

Obtaining a higher resolution map of the rock structure and mineral concentration before blasting of the boreholes and rock processing is desirable so that the end production efficiency and overall onsite safety can be increased.

One way of creating higher resolution maps is by the assay of cuttings acquired from the drilling holes for insertion of explosives to create the blasting. However, this is a time-consuming process relating to both the correct collection of the cuttings and the analysis of the same. Additionally, this data only provides some of the geological data of the bore hole and/or the area of interest surrounding the borehole. Additional issues arise in that the volume of the drill hole may be uncertain after drilling due to possible caving of the cuttings pile at the surface, borehole drilling deviation from the rig and/or formation itself, or sloughing of the borehole walls. Volume uncertainty in the loaded blast hole can produce areas of over blast and under blast across the bench due to incorrect loading based on insufficient geological data. Additionally, the voids produced along a drill hole can result in an inconsistent volume distribution of explosives in the blast hole which can also produce areas of over blast and under blast. Both issues, if not characterized before blasting, can result in undesirable rock fragmentation after blasting. These processes and issues are also typical for quarry applications. In the case of construction, where the blast holes may be near existing structures or where fly rock is an issue, knowledge of the drill hole is critical when loading such blast holes with explosives as damage can occur to the existing structures through fly rock or over blasting due to overloading of the blast hole with explosives or even under blasting in which case the remaining formation will need to be removed by other means thus increasing costs and decreasing efficiencies.

In addition to assaying cuttings, another method of increasing the resolution of the block geological model is to take measurements of the geologic features along the length of the drill hole while drilling or after drilling and before charging of the blast holes for blasting. However, standard borehole logging instruments are designed for exploratory drilling, are only able to log one or two geophysical attributes of the borehole requiring multiple logging instruments or have a stacked configuration leading to the tool having undesirable attributes for logging drill holes. These conventional logging tools are small in diameter and long in length having stacked sensor modules which distribute the various sensors along the length of the borehole. The long length of the instrument and distributed sensors results in the upper sensors not being able to be deployed all the way to the bottom of a drill hole. This prevents a full log of the drill hole to its toe and does not enable the logging of the drill hole in one pass, as another tool may need to be deployed in order to log the full length of the drill hole. Further, the small diameter of the instruments, when deployed are not centralized in the typical large size blast hole, can produce little or an insufficient magnetic susceptibility response to provide the geological data required. Additionally, the recommended logging speed for conventional logging tools is generally on the order of 1 to 2 meters per min which is far too slow for efficiently logging drill holes in a production comminution environment. Finally, a method for detailed profiling of the drill hole at a high speed is not available in these conventional tools. A "fit for purpose" logging tool that addresses the short comings described above is described in the following disclosure.

SUMMARY

The example implementations disclosed herein provide in a first aspect a modular drill hole logging tool configured to measure one or more geophysical parameters. A diameter and profile measurement system is associated with the logging tool and one or more removable modules comprising a water/mud sensor assembly engaged downwardly from the diameter and profile measuring system, a spectral gamma system contained at least partially within the diameter and profile measurement system, and, a magnetic susceptibility and conductivity system mounted intermediate the water/mud sensor assembly and the diameter and profile measuring system, and a transmission system communicates commands to the drill hole logging tool and data representing the geophysical parameters from the logging tool. A down hole control module communicates commands to the drill hole logging tool and data representing geophysical parameters from the logging tool.

In another aspect there is disclosed a water/mud sensor assembly engaged downwardly from the diameter and profile measuring system.

In another aspect there is disclosed a spectral gamma system contained at least partially within the diameter and profile measurement system.

In another aspect there is disclosed a magnetic susceptibility and conductivity system mounted intermediate the water/mud sensor assembly and the diameter and profile measuring device.

Further aspects of the disclosure provide a diameter and profile measurement system for a drill hole logging tool. A plurality of caliper arms are independently rotatably extendible from a caliper body. A deployment assembly is configured to deploy and retract the plurality of caliper arms. An angular displacement measurement assembly is operably engaged to each of the plurality of caliper arms.

In another aspect, each of the plurality of caliper arms are interchangeable or telescopic to provide different lengths with the lengths configured to allow the greatest range of angular motion of the arm while maintaining contact with a drill hole wall.

In another aspect, each of the plurality of caliper arms is independently operable to accommodate and record differing relative radius around a circumference of the drill hole.

In another aspect, each of the plurality of caliper include a tip sensor. The tip sensors can be a ultrasonic, piezo, resistive contact sensors or scratcher sensors.

Additionally, further aspects of the disclosure provide a drill hole logging system including an autonomous tracked or wheeled vehicle incorporating a multi-segmented articulating arm and a tool canister attached distally to the multi-segmented articulating arm, the tool canister housing deployment rigging for a wireline and drill hole logging tool. The tool canister is maneuverable by the articulating arm for extension over tailings from a drill hole to align the canister with the drill hole. The drill hole logging tool is protected inside the canister during maneuvering and then extended into and retracted from the drill hole to conduct measurements.

In a final aspect the disclosure provides a method to measure the depth of a drill hole with a drill hole logging tool. Modular units comprising a tool head, down hole control module, diameter and profile system and a water/mud sensor are assembled in to the drill hole logging tool, wherein the water/mud sensor is at a bottom end of the drill hole logging tool, being the opposite end to the tool head. The tool head is attached to a cable, such as a wireline, engaged to a winch adapted to lower the tool downhole, said winch provided with a measuring device or the wireline provided with measurement units along its length. The water/mud sensor is checked to confirm that it is operational. The drill hole logging tool is positioned above the drill hole. The measuring device is zeroed or, if using the measurement units, the starting point noted. The winch is depressed allowing the drill hole logging tool to fall under gravity. When the bottom of the hole is reached or if there is water in the hole, the tool is stopped through either hitting the bottom of the hole or the water stopping the free fall of the tool. Alternatively, a signal is sent from the water/mud sensor upon sensing the water stopping the winch responsive to the signal. On stopping, a measurement of the drill hole depth is taken by noting the measurement units on the cable or the measuring device recording the same.

Definitions

In this specification and claims, except where the context requires otherwise due to express language or necessary implication, "geological data" is intended to include geophysical data, petro physical data, hole geometry data, and mineralogical data and compositional data. Such geological data includes but is not limited to any or a combination of any two or more of the following as measured by the relevant sensor:—
Gamma radiation
density
reflectivity of electromagnetic radiation, acoustic or ultrasonic waves,
magnetic susceptibility
electrical resistivity/conductivity/impedance
magnetic vector field
hole dip
temperature
sonic velocity
contact hardness
hole azimuth, diameter, profile, volume
water level
"hole geometry data" is intended to include one or more of hole depth, volume, attitude and the presence and/or configuration of fractures or voids.
"bore hole" and "drill hole" are to be used interchangeably and refers to a hole drilled specifically as part of a hole array by a drill rig in a formation or area of interest or bench which is to be logged,
"blast hole" is a bore hole or drill hole into which explosives are to be provided and detonated.

DESCRIPTIONS OF DRAWINGS

The features, functions, and advantages that have been discussed can be achieved independently in various implementations or may be combined in yet other implementations further details of which can be seen with reference to the following description and drawings.

FIG. 2 is a representation of an implementation of the drill hole logging tool (shown in a horizontal orientation) with caliper arms of the diameter and profile system extended;

FIG. 3 is a representation of the implementation of FIG. 2 with the caliper arms retracted;

FIG. 5 is a representation of a second implementation of the drill hole logging tool (shown in a horizontal orientation) with caliper arms of the diameter and profile system extended;

FIG. 6 is a representation of the implementation of FIG. 5 with the caliper arms retracted;

DETAILED DESCRIPTION

Figure 1A:
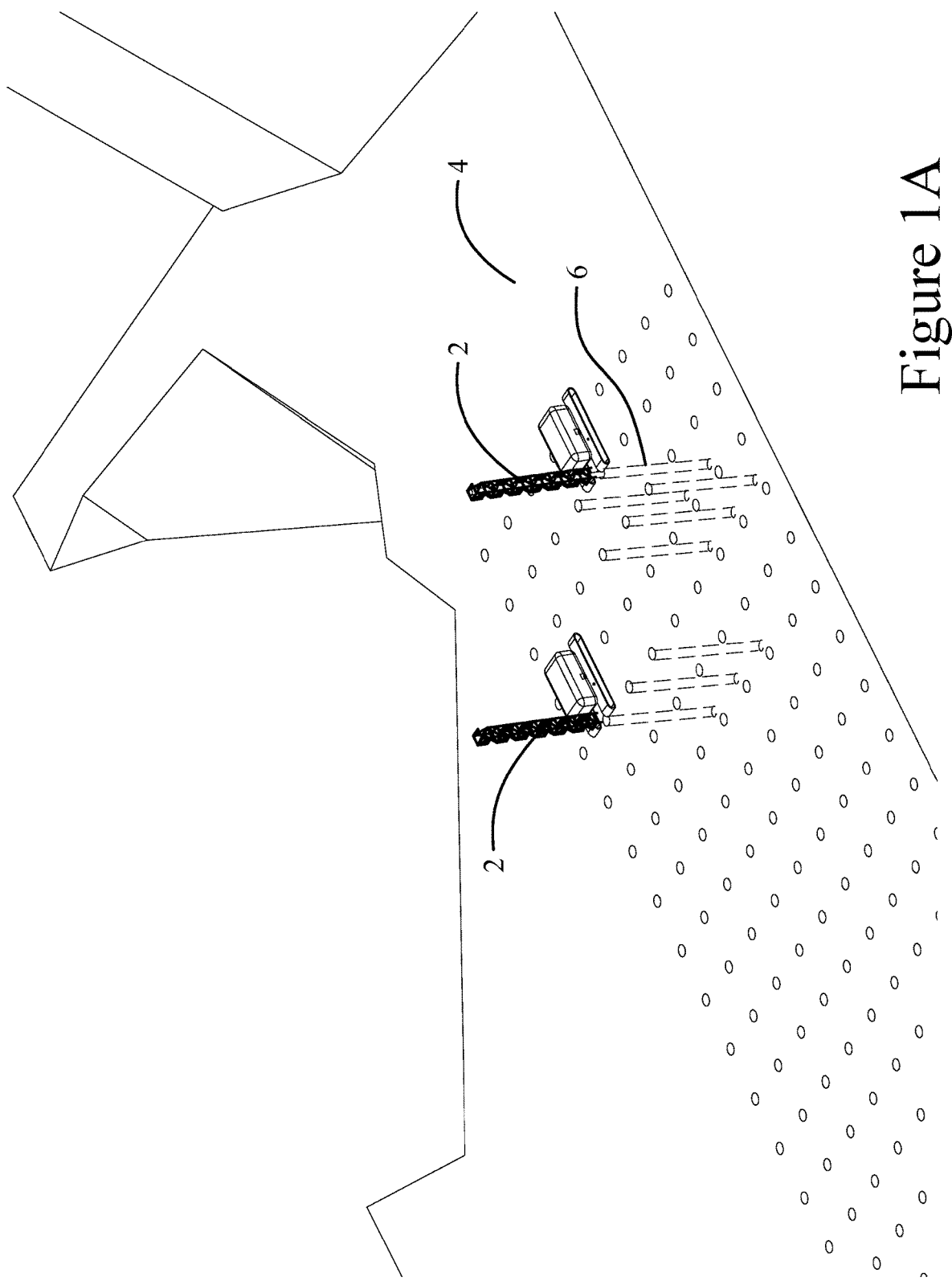
FIG. 1A is a depiction of a bench in which an array of drill holes is created with one or more drill rigs and on which implementations of a drill hole logging tool may be employed in an above ground situation.

Blast hole is a general term used to describe drill holes that have been created in a formation or area of interest or bench, intentionally for the express purpose of being provided with explosives. The blast holes are in general additionally stemmed after being loaded with explosives to ensure correct blasting. It is therefore important to understand the geophysical characteristics of the drill hole and therefore of the overall formation or area of interest or bench as part of the overall geographical block model to ensure correct explosive loading and detonation of the same. In instances where the drill hole is wet, then additional explosives must be provided as opposed to a drill hole that is dry. The resultant rubble after detonation can then be removed. Upon removal it can be further processed as for example in mining or quarrying applications or removed from site, such as in construction. In general, a drill hole drilling plan is created that sets out a series of holes that are to be drilled into the bench, formation or area of interest. With reference to FIG. 1A at least one drill rig 2 is on the bench 4 which drills an array of drill holes 6 in accordance with a drilling plan. More than one drill rig can be provided to move across the bench in order to drill the required number of holes within a set time frame. In an underground situation, a similar scenario exists.

In general, the depth of drill holes that are to be used as blast holes or as grade control holes are between about 5-100 m, between about 10-95 m, between about 15-90 m, between about 20-80 m, between about 25-75, or between about 30-70 m. Typical diameters of a drill hole, particularly for above ground drilling sites, is between about 10-50 cm, between about 12-45 cm, between about 15-43 cm, between about 18-40 cm, between about 20-38 cm or between 22-36 cm. In underground drilling situations, typical diameters of a drill hole can be of a smaller size, such as between about 5-40 cm, between about 6-35 cm, between about 7-30 cm, between about 8-25 cm, between about 9-20 cm, between about 10-15 cm, It is desirable to log a drill hole, whether in an above ground or underground site, at a rate of between about 5-30 m/minute, or preferably between about 8-25 m/minute, or preferably between about 9-23 m/minute, or preferably between about 10-20 m/minute. Given these constraints, there is a need to be able to log the entire length of the drill hole in a timely and efficient manner. Referring to the drawings, FIG. 1B describes a drill hole logging system 5 that is dimensioned to take into account these drill hole sizes, that is a fit for purpose tool. The dimensions of the tool range between a diameter similar to that of the drill hole, whether in an above ground or underground situation, in particular from between about 4.5-35 cm, between about 4-30 cm, between about 3.5-25 cm, between about 3-20 cm, between about 2.5-15 cm or between about 2.5-10 cm and having a length of less than 3 m, or less than 2.8 m, or less than 2.5 m, or less than 2.3 m, or less than 2 m. A drill hole logging tool 10 is shown deployed in a drill hole 20 conveyed on a wireline 30. For this notional implementation, a winch 40 mounted on a deployment vehicle 50 deploys the wireline. The type of deployment vehicle 50 can range from autonomous, driven or even the drill hole drill rig itself. An interface and computing system 55 decodes and encodes communications to the drill hole logging tool 10. A wireless connection 57 provides a means to command the system for remote operations and to communicate data back to a central data collection system 58 such as a cloud computing resource.

Figure 4:
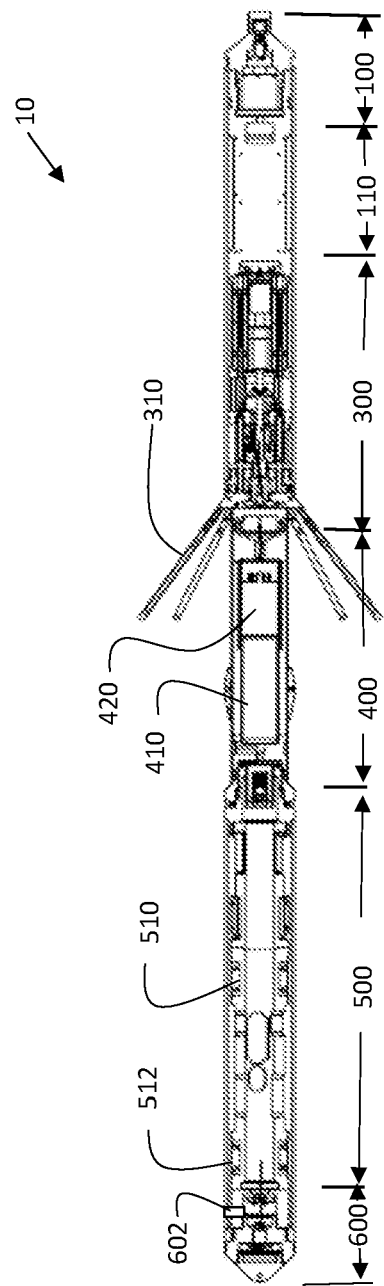
FIG. 4 is a cross section view of the implementation of FIG. 2.

A first example implementation of the drill hole logging tool 10 is shown in FIGS. 2 and 3 with caliper arms 310 extended and retracted, respectively. FIG. 4 shows the mechanical layout of the drill hole logging tool 10. A tool head 100 passes a power and an external communication link to a power and communication section of the tool having a down hole control module 110. Multiple modular geological data collecting sensors may be selectively added or removed as required from the drill hole logging tool 10. A diameter and profile system 300 for the example implementation incorporates a caliper assembly having a plurality of independent caliper arms 310, configured to contact the drill hole wall to measure diameter and profile of the inside of the drill hole. A spectral gamma system 400 is disposed adjacent to the diameter and profile system. The spectral gamma system includes a cesium iodide gamma ray detector 410 (commonly known as a scintillator crystal) and a photomultiplier tube 420 concentrically recessed under the caliper arms 310 to reduce the length of the drill hole logging tool 10. Positioning of the photomultiplier tube 420 nested under the caliper arms 310 while extending the gamma ray detector 410 lower on the drill hole logging tool prevents shadowing of the detector by the arms. A magnetic susceptibility and conductivity system 500 is incorporated in a detachable carrier that can be configured based on the requirements for a specific logging requirement. In the example implementation, the magnetic susceptibility and conductivity system 500 employs a receiver coil 510 responsive to a transmitter coil 512 to obtain both magnetic susceptibility and conductivity measurements. Supplemental elements such as a water/mud sensor module 600 are added downwardly extending from the magnetic susceptibility and conductivity system 500. Addition of the water/mud sensor module 600 to determine if the drill hole is wet is desirable for a variety of reasons including determining where the water level is in the hole, where the water table is, calculating the correct explosive loadings etc. For a variety of reasons, including environmental, location, inability to drain drilling sites etc., drill holes being measured are increasingly wet. Thus knowing that the drill holes are wet is an essential part of understanding the geological characteristics of the drill hole and particularly the mine site geology along with the geophysical properties of the drill hole. Each of the diameter and profile system 300, spectral gamma system 400, magnetic susceptibility and conductivity system 500 and the water/mud sensor module 600 are modular in construction and separately attachable or removable as a portion of the drill hole logging tool 10. Optionally, a temperature probe 602 could be provided to this system, where the temperature probe could be situated on or about the water/mud sensor module 600.

In an example drill hole logging tool 10 in the configuration of the first implementation, overall tool length 11 is 1.9 m with a case diameter 12 of 10 cm generally defining a tool body 13. This provides distance from water/mud sensor module tip to the magnetic susceptibility and conductivity senor of 38 cm, distance from the tip to the Gamma of 90 cm, distance from tip to the Caliper Sensor of 1 m, and distance from the tip to the communications section of 1.7 m. Case diameter 12 of at least 10 cm provides maximum available diameter for the gamma ray detector 410 and the components of the magnetic susceptibility and conductivity system 500 (described in greater detail subsequently) with spacing from the drill hole wall of 15 cm or less for maximum efficiency. Overall tool length of less than 2.5 m provides access by all of the measurement tools of the drill hole logging tool to substantially log the full extent of the relatively short drill hole 20 for maximum coverage of the geological data characterization of the same.

Figure 7:
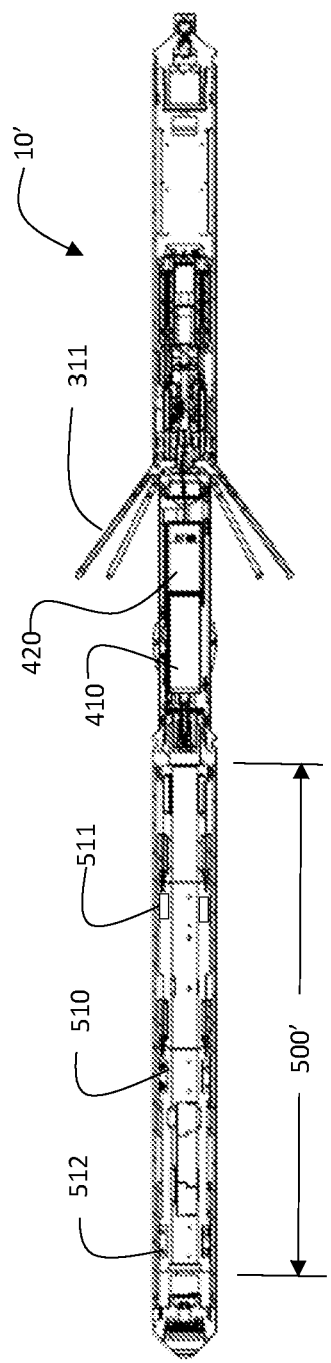
FIG. 7 is a cross section view of the implementation of FIG. 5.

FIGS. 5 and 6 show a second example implementation of the drill hole logging tool 10' with the caliper arms 310 extended and retracted, respectively. FIG. 7 shows the structure of the second implementation wherein the magnetic susceptibility and conductivity system 500' incorporates at least one additional receiver coil 511 responsive to the transmitter coil 512 to provide focused conductivity measurement.

Figure 8:
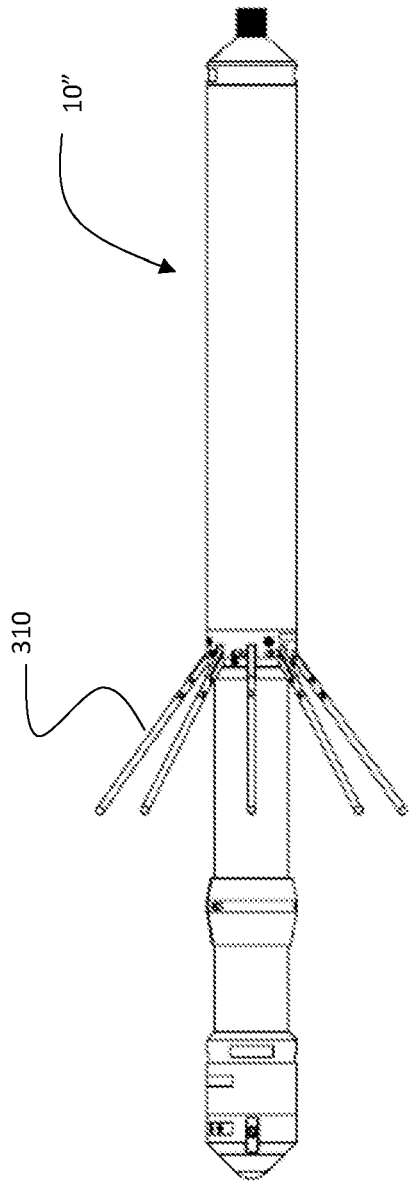
FIG. 8 is a representation of the drill hole logging tool with selected modular elements removed creating a shorter configuration of the tool.
Figure 9:
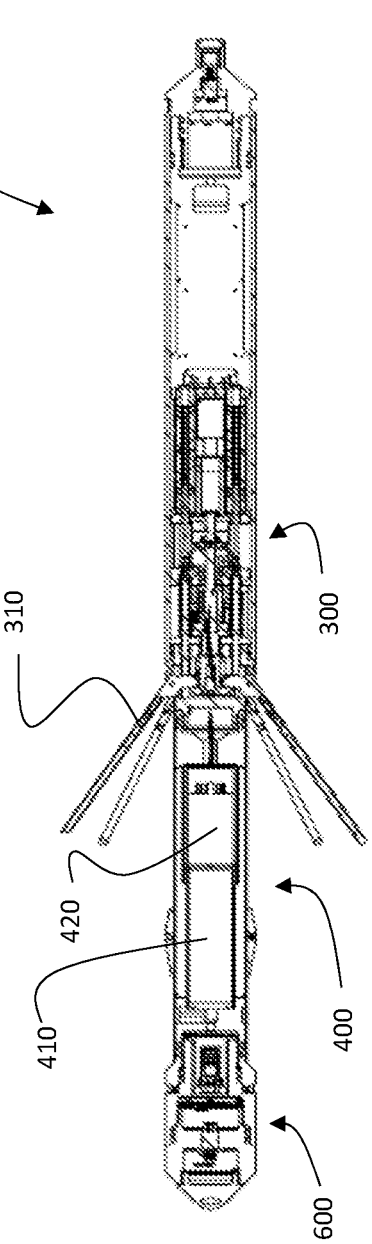
FIG. 9 is a cross section view of the implementation of FIG. 8.

FIGS. 8 and 9 demonstrate a configuration of the drill hole logging tool 10" without the modular magnetic susceptibility and conductivity system 500 inserted. In this implementation, the water/mud sensor module 600 is attached directly to the diameter and profile system 300. The spectral gamma system 400 is also modular and may be removed from the body of the drill hole logging tool 10 to provide a combined diameter and profile system 300 with the water/mud sensor module 600 solely for characterization of the drill hole itself, in particular the geophysical data relating to the hole geometry data including water.

Figure 1B:
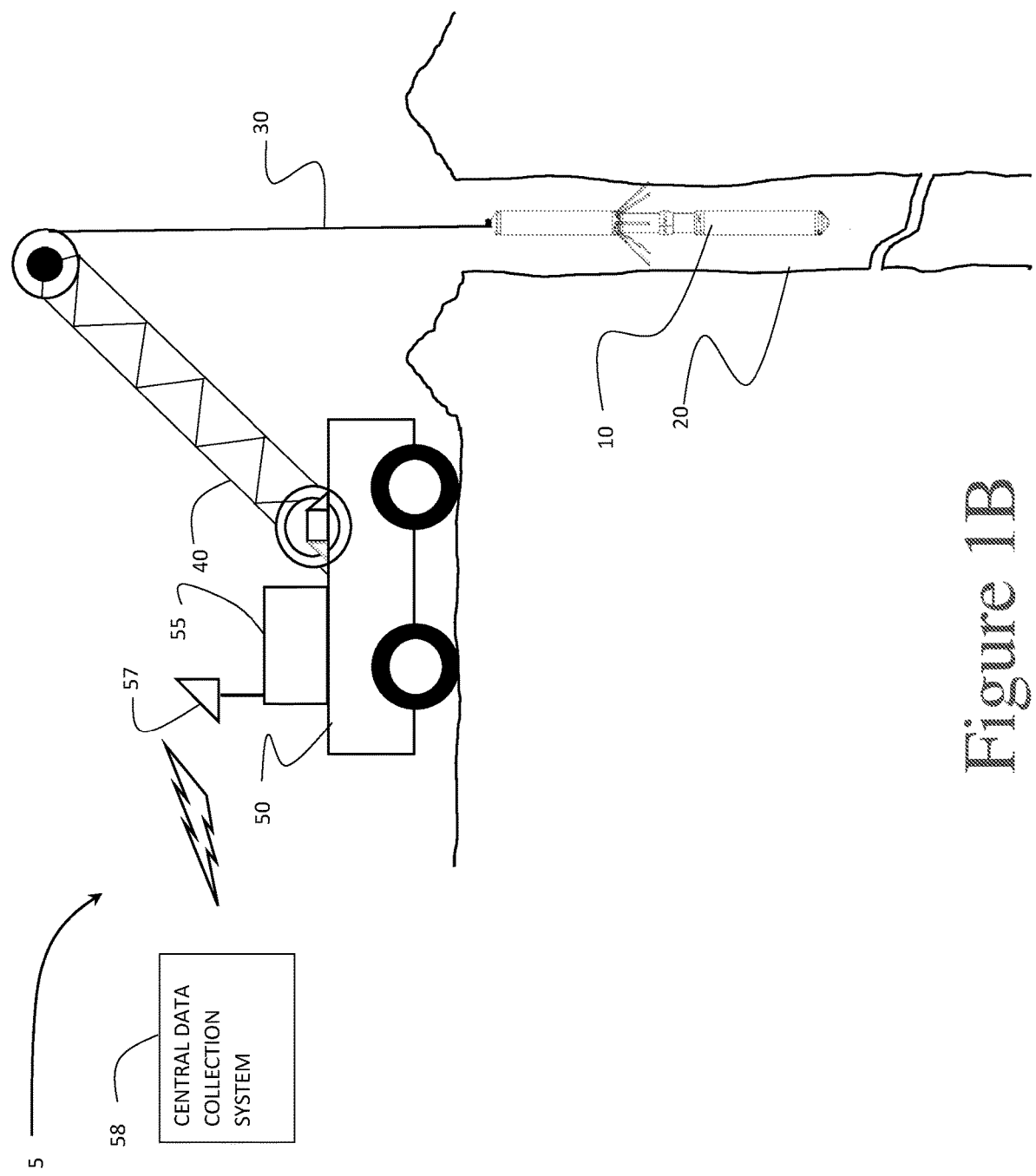
FIG. 1B is a depiction of the drill hole logging tool deployed in a drill hole.

If a driller wishes to measure the depth of a drill hole, then with reference to FIGS. 1B and 4, the driller will assemble modular units comprising the tool head 100, down hole control module 110, diameter and profile system 300 and the water/mud sensor module 600 in that order. These modular units can be readily assembled at the mine site or off site, where the units can be threadedly engaged, or in other embodiments can utilize a click engage system to enable quick and easy assembly. It is essential that the water/mud sensor module 600 is at the bottom end of the tool, being the opposite end to the tool head 100. Once assembled, the driller will attach the tool head to a cable such as the disclosed wireline 30 engaged to the winch 40 that will lower the tool downhole. The driller will also check that the water/mud sensor is operational. The winch 40 will be provided with a measuring device or the wireline 30 is provided with measurement units along its length, such that the driller or processor can log the length of cable dispensed as the drill hole logging tool 10 is lowered downhole. The drill hole logging tool 10 is then positioned above the drill hole 20 and before it is lowered downhole, the measuring device is zeroed or if using the measurement units—then the starting point is noted.

The winch 40 is then depressed, the drill hole logging tool 10 falls under gravity and logging of the depth begins. When the bottom of the hole is reached or if there is water in the hole, the tool will stop through either hitting the bottom of the hole or the water stopping the free fall of the tool. Additionally, the water/mud sensor module 600 will sense the water and can send a signal uphole. On stopping, the driller can now take the measurement of the drill hole depth by noting the measurement units on the cable or the measuring device recording the same. An advantage of this depth measurement arrangement is that minimal calibration is required, that provides time and efficiency advantages.

It can be envisaged, that additional measurements can be obtained where modular units of the caliper arms 310 in a diameter and profile system 300, and a spectral gamma system 400 can be added to this arrangement providing a drill hole caliper and gamma system. This implementation is shown in FIGS. 8 and 9.

Arrangement of the sensors in the example implementations allows concurrent operation of the sensors with virtually no interference from each other and that they are able to measure the maximum number of drill hole geological data properties. Arrangement of the spectral gamma system 400 adjacent to the diameter and profile system 300 nested within the caliper arms 310 allows maximum spacing from the elements of the magnetic susceptibility and conductivity system 500 to minimize interference between the same while concurrently minimizing the overall length of the drill hole logging tool 10.

Figure 10:
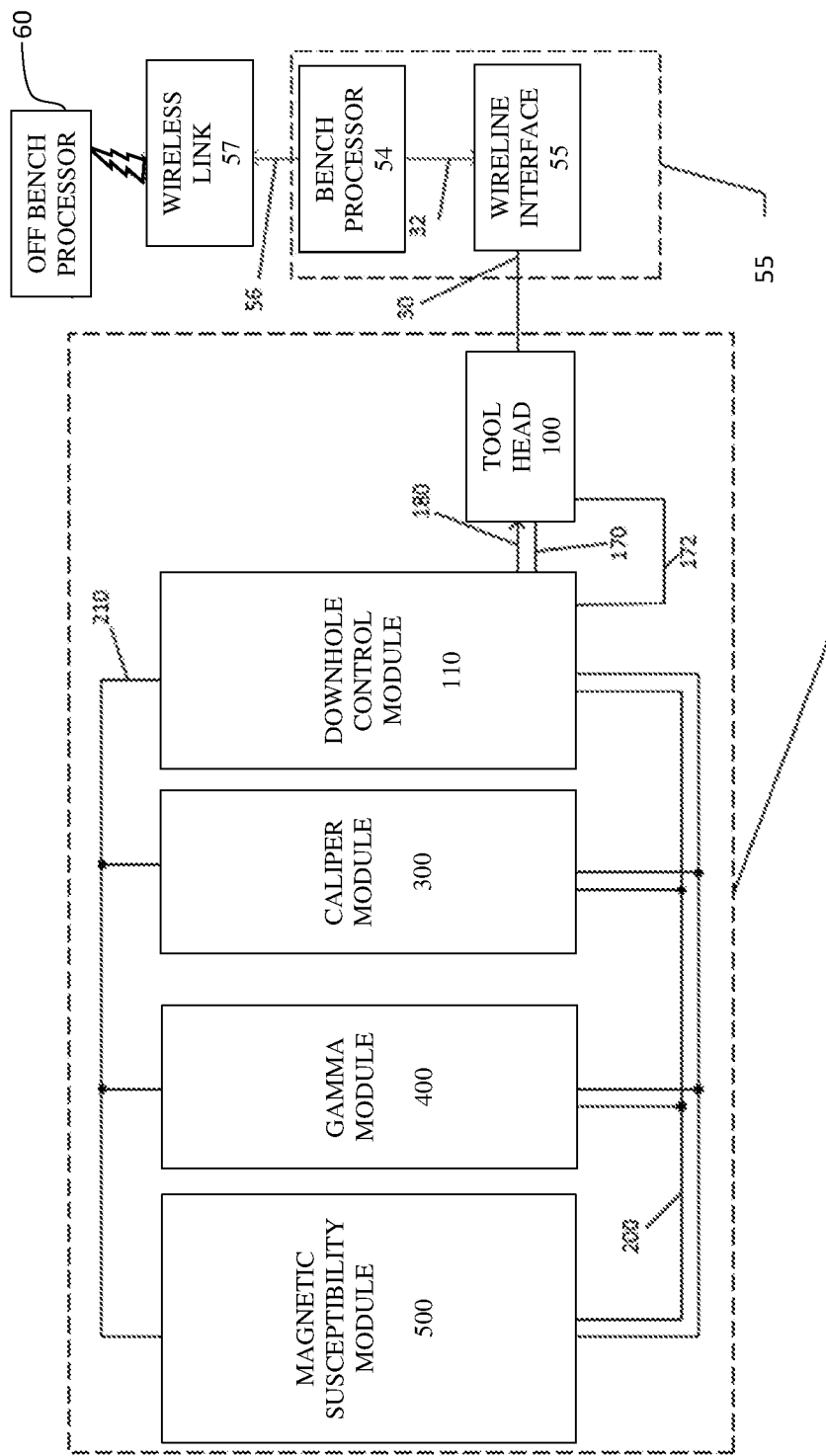
FIG. 10 is a functional block diagram of an implementation of a drill hole logging system.

FIG. 10 provides a schematic representation of the interconnections between the components of the drill hole logging system. A wireless link 57 is connected to a bench processor 54 through a high speed ethernet or local wireless connection 56. The wireless link 57 may be a cellular, satellite or wide area Wi-Fi connecting the bench processor 54 to an off-bench Infrastructure 60. The off-bench infrastructure 60 may be a remote private network or a commercial cloud computing service. Bench processor 54 may also be operated locally. Bench processor 54, wireline interface circuit 53, wireline 30, tool head 100 and communication conductors 180 provide the means for the bench processor 54 to communicate commands to and receive data from the drill hole logging tool 10.

Drill hole logging tool 10 comprises a tool head 100 that mechanically interfaces the wireline power 170, ground 172 and communication conductors 180 into the downhole control module 110. Downhole control module 110 provides a power bus 210 and a CAN communication bus 200 that is distributed to the spectral gamma system 400, diameter and profile system 300 and the magnetic susceptibility and conductivity system 500.

Figure 11:
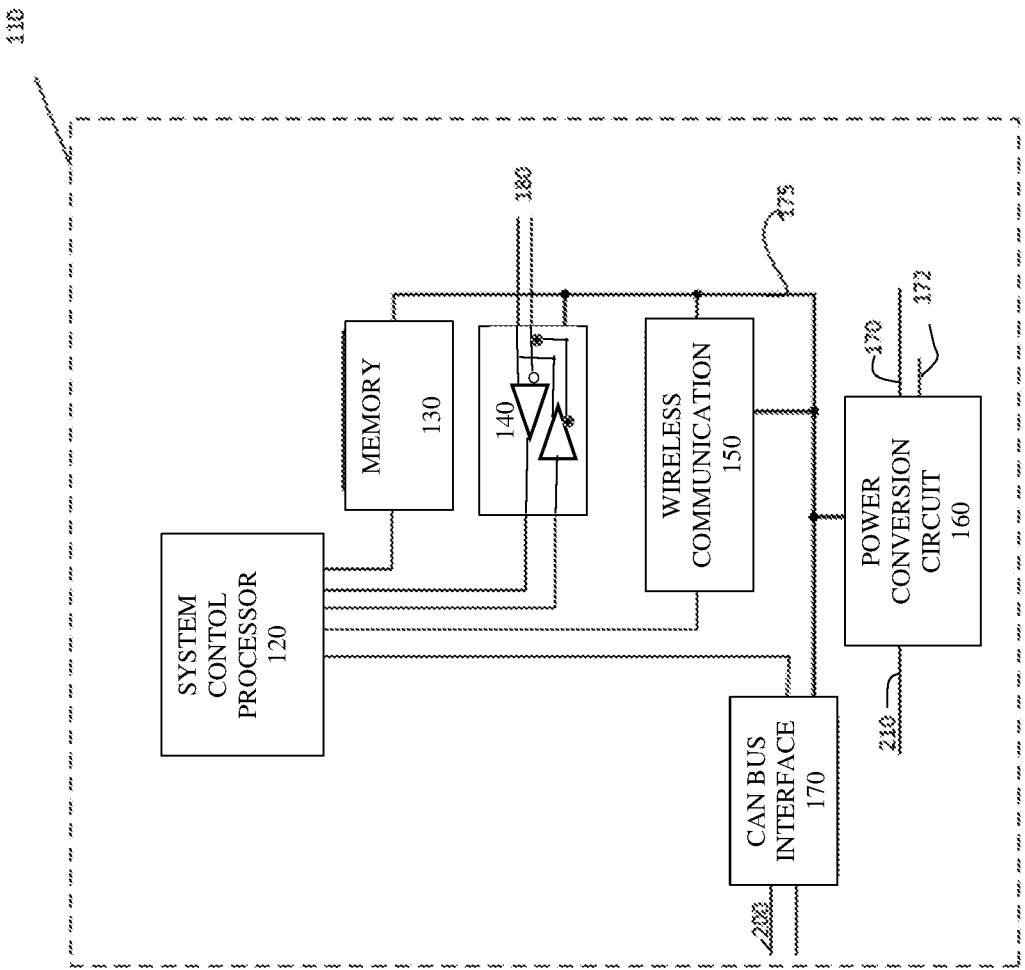
FIG. 11 is a functional block diagram of a downhole control module.

FIG. 11 is a functional diagram of the downhole control module 110. A power conversion circuit 160 receives wireline power 170 and wireline ground 172 processing the voltage and distributing various voltages 175 to the internal components of downhole module 110 as well as externally on power bus 210. A system control processor 120 passes communication data and commands between the downhole sensor modules namely the diameter and profile system 300, spectral gamma system 400 and magnetic susceptibility and conductivity system 500 and the bench processor 54 through the CAN Bus Interface 140. The up-hole communication interface 140 contains a transceiver that converts the single ended digital transmit and receive interface of the System Control Processor 120 to the differential transmission system used to communicate up hole to the Bench Processor 54. A flash memory 130 provides a means to store high resolution data from the geological data sensors, namely the diameter and profile system 300, spectral gamma system 400 and the magnetic susceptibility and conductivity system 500.

Figure 12:
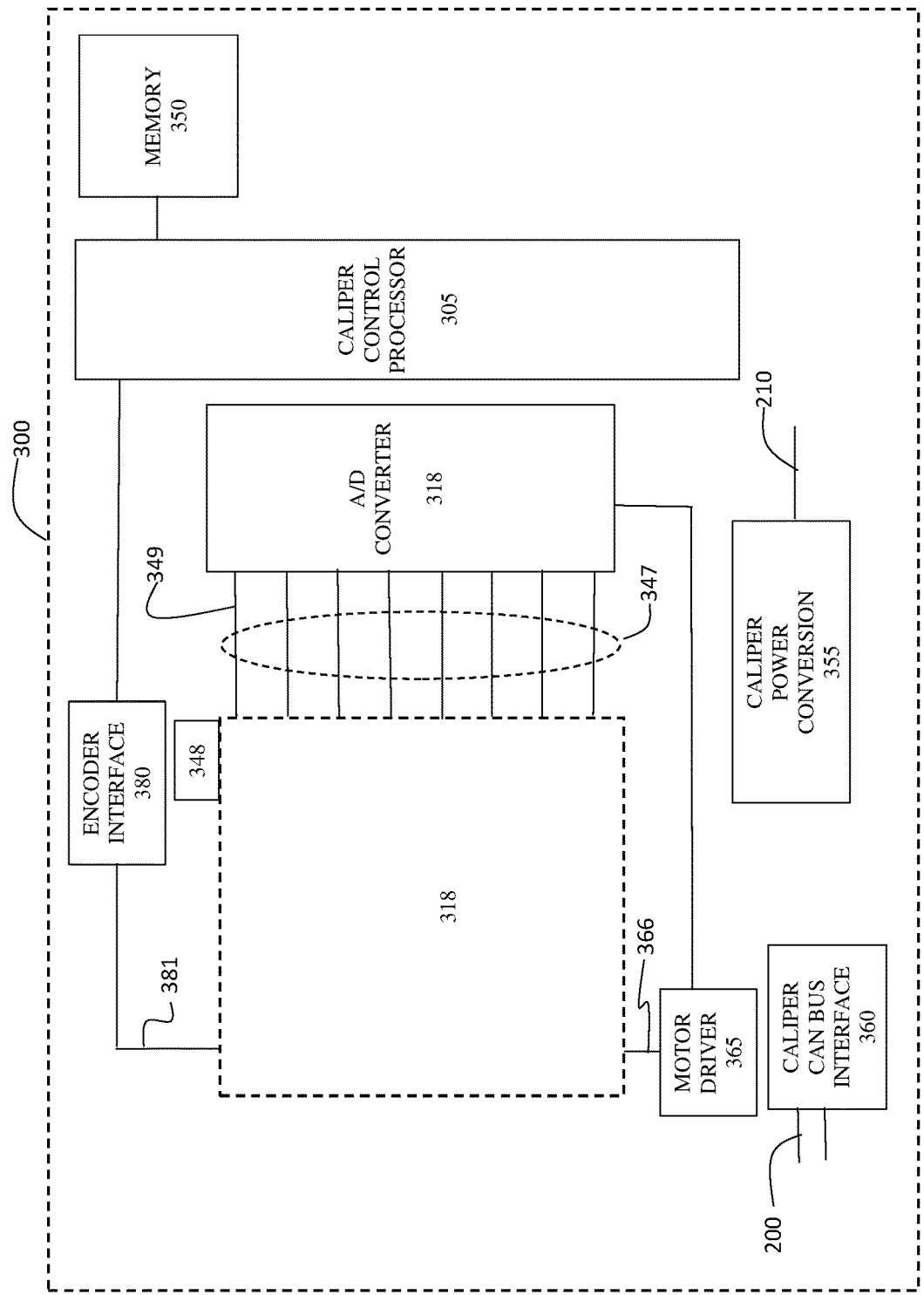
FIG. 12 is a functional block diagram of a caliper module.

Referencing FIG. 12 the functionality of the diameter and profile system is described. A caliper control processor 305 communicates with the downhole control module 110 through a caliper CAN bus interface 360. A memory 350 stores calibration coefficients for use in processing the raw caliper measurement data. A caliper arm assembly 318 provides the mechanical means for deploying and retracting the plurality of independent caliper arms 310 (two or more with eight in the example implementation) and providing the voltage output signals 347 for each of the eight caliper arm channels. An analog to digital converter 315 converts the eight voltage outputs signals 347 to a digital representation presenting them to the caliper control processor for application of calibration coefficients and transmission on to the downhole control module 110. A motor driver 365, encoder interface 380 and limit switch 348 provide control to the deployment and retraction of the caliper arms. Caliper power conversion 355 converts system power 210 to the voltage necessary to power local caliper subsystems.

Figure 13:
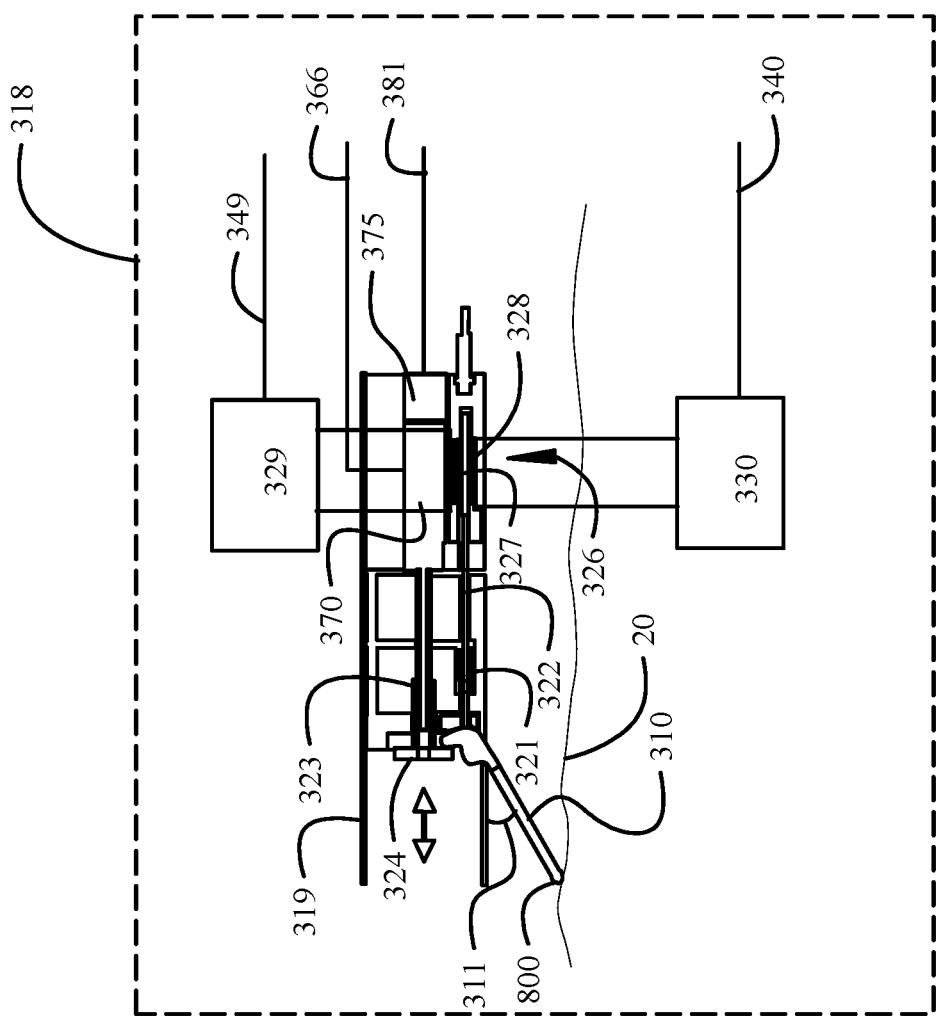
FIG. 13 is a detail of a caliper arm assembly.

As the operation of each of the caliper arms 310 are mechanically identical, the operation of a single arm fully describes the operation of the caliper arm assembly 318. FIG. 13 shows the detail of the caliper arm assembly 318 showing only one caliper arm 310. The arm is deployed and retracted by a deployment assembly having a lift flange 324 that is moved laterally by lead screw 323 that is rotated by the motor 370. When deployed, the lift flange 324 moves in a first direction (laterally to the left in the drawings as shown) allowing the caliper arm 310 to move away from the caliper body 319. A measurement assembly includes a spring 321 provides a force through the pushrod 322 moving the caliper arm outward until it contacts the wall of drill hole 20. The pushrod 322 is additionally connected to a core of a linear variable displacement transducer (LVDT) 326 measuring the angular displacement (angle 311) of the caliper arm 310. The caliper control processor 305 provides a control signal 340 to an AC current generator 330 driving a primary coil 328 in the LVDT 326. Secondary coils 327 provide an induced output voltage to a detector 329 which provides an output signal 349 to the A to D converter 315 for position of the LVDT. The caliper control processor 305 calculates the drill hole radius at the contact point of each caliper arm by the angular displacement. When retracting, the lift flange 324 is moved in a second direction (to the right in the drawings as shown) by lead screw 323 and the motor 370 contacting and retracting the caliper arm 310 until it is parked adjacent to the caliper body 319. Limit switch 348 (seen in FIG. 12) provides feedback to the caliper control processor 305 to terminate the motor drive and stop the arm movement in the park position.

The individual caliper arms 310, constructed of metal tubing or similar materials, are interchangeable (or telescopic) to provide different lengths; a longer arm for use in larger diameter holes and a shorter arm for use in smaller diameter holes allowing the greatest range of angular motion of the arm while maintaining contact with the drill hole wall. This provides the greatest range of extension/retraction in the LVDT 326 to enhance resolution. A range of hole diameter measurement is available with varying arm lengths to achieve an operable length. This can be achieved where the arm lengths can be between about 10 to 45 cm, between about 12-42 cm, between about 10-40 cm, to achieve an operable length of between about 12-30 cm, between about 10-25 cm, to between about 8 to 20 cm or between about 5 to 15 cm. "Operable length" is defined herein as the radius of extension of the arm at the fully extended position. Each caliper arm 310 is independently operable to accommodate and record differing relative radius around the circumference of the bore hole. Additionally, each caliper arm bay include a tip sensor 800 such as ultrasonic, piezo, resistive contact sensors or scratcher fingers at distal ends of the arms to measure contact hardness of the drill hole. This enables additional information about the drill hole to be gathered.

Figure 14:
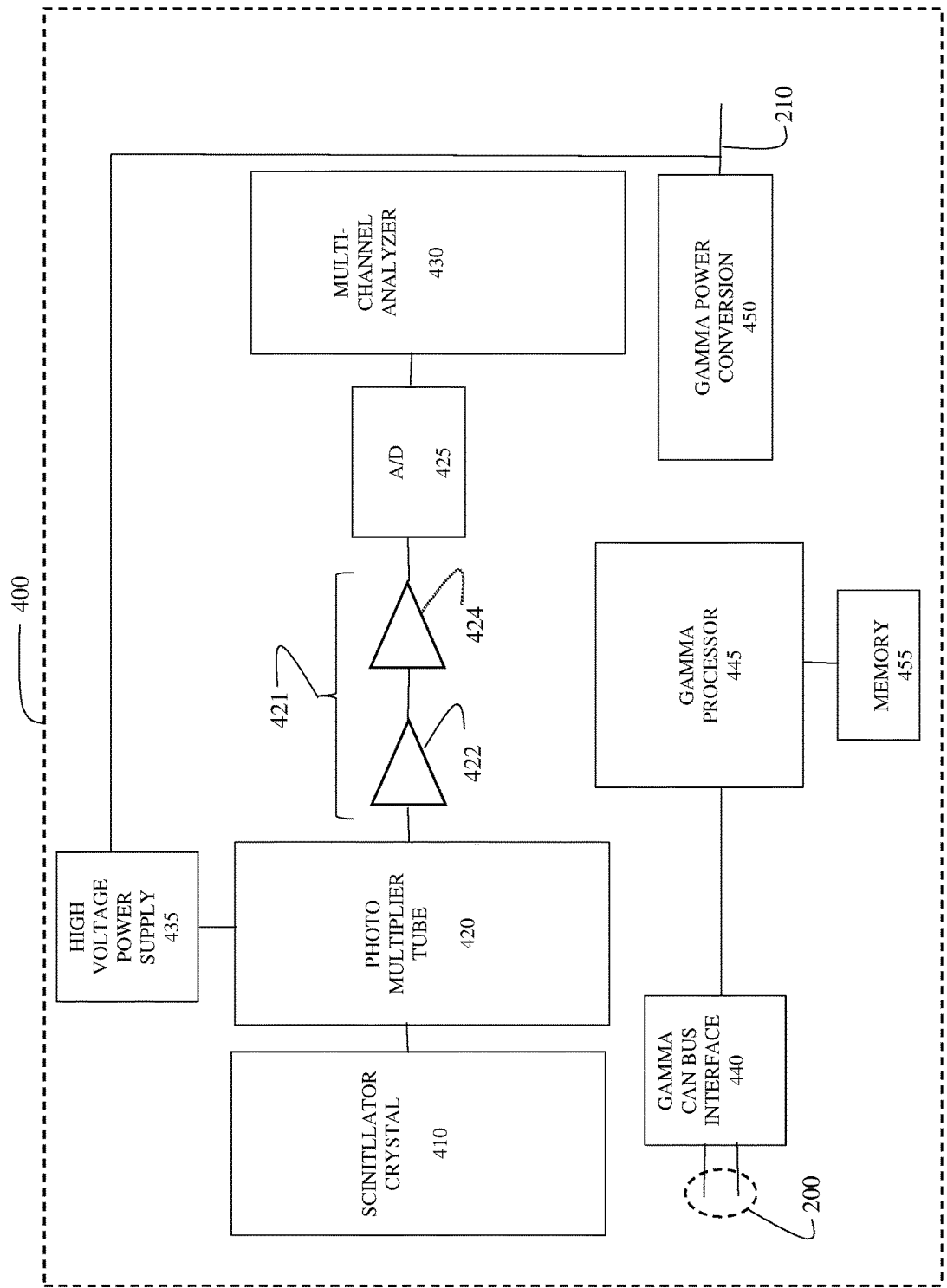
FIG. 14 is a functional block diagram of a spectral gamma module.

Referring to FIG. 14, the spectral gamma system 400 is described. Scintillator crystal 410 provides for the detection of gamma radiation through the scintillation of light produced by the interaction of the gamma ray with the scintillator crystal material. Both inorganic and organic materials can be used of various types. The preferred material for the disclosed logging tool is Cesium Iodide Christal doped with a Sodium activator CeI(Na), although various other materials are applicable such as Sodium Iodide doped with Thallium (NaI(Tl)). When a gamma ray photon of the appropriate energy level meets the scintillator crystal 410, a light pulse is created which propagates through a window into an entrance aperture of a photomultiplier tube (PMT) 420 where it excites a photocathode emitting photoelectrons that are accelerated and multiplied through repeated interactions with electron multipliers known as dynodes. Finally, the multiplied photoelectrons are collected by the anode. The charge collected on the anode by the accumulation of the photoelectrons are presented to a pulse shaping circuit 421. An integrator circuit 422 accumulates the photoelectrons passing the resultant pulse to a differentiator 424 producing a conditioned pulse amplitude proportional to the energy level of the gamma ray. A to D converter 425 samples the differentiator 424 output converting the gamma ray pulse to a digital representation. A multichannel analyzer 430 counts the gamma ray pulses accumulating the gamma ray events within energy level bins based on the digital representation of the pulse height. Gamma processor 445 reads the accumulated counts from the multichannel analyzer (430) passing data on to the downhole control module 110 through the gamma CAN bus interface 440. Gamma power conversion circuitry converts the voltage from the power bus 210 to the various voltages required for the circuits contained in the module for the spectral gamma system 400. High voltage power supply 435 provides 1500 Volts to the dynode of the photomultiplier tube 420.

Figure 15:
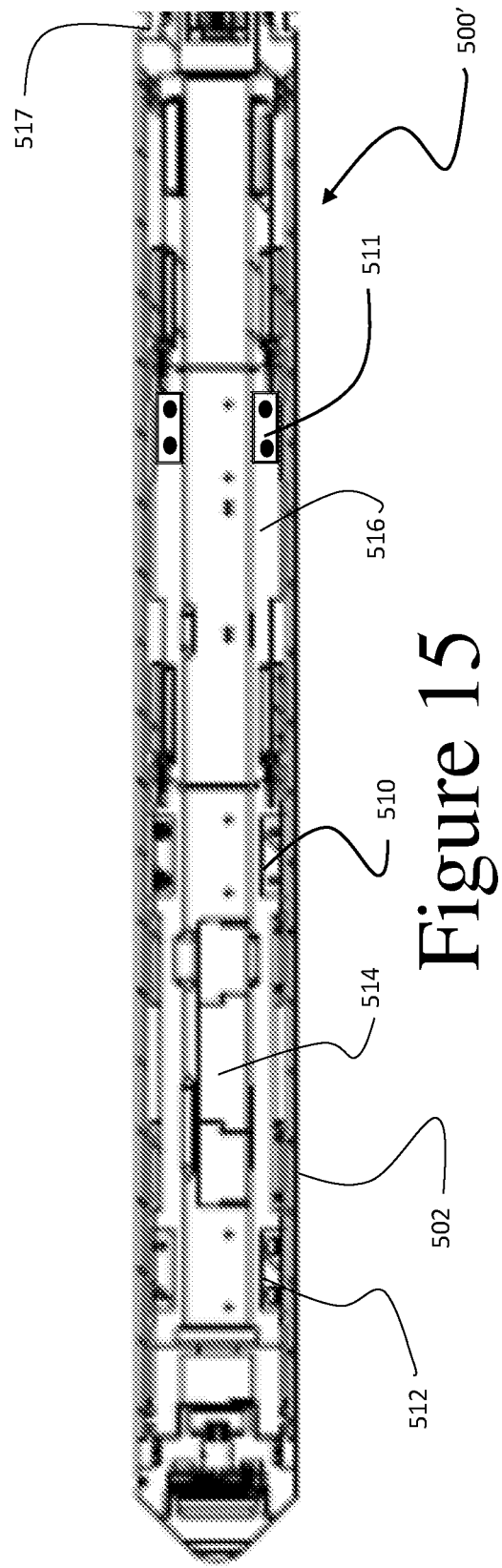
FIG. 15 is a detailed section view of the module housing the magnetic susceptibility and conductivity system of the second implementation shown in FIG. 7; and, FIG. 16 is a pictorial representation of an implementation for deployment of the drill hole logging instrument.

The magnetic susceptibility and conductivity system 500' of the second example implementation of the drill hole logging tool 10' of FIGS. 2-7 is shown in greater detail in FIG. 15 and includes a tool chassis 502 formed from a non-conductive and thermally stable material such as but not limited to laminated fiberglass. Upon chassis 502, a transmitter coil 512 and at least two receiver coils 510, 511 are wrapped. Mounted on the chassis 502 between transmitter coil 512 and receiver coil 510 is a circuit board 514 containing the support circuitry required to drive the transmitter and signal process the output of the receiver coils 510, 511. The second receiver coil 511 is mounted to an extension chassis 516 extending from the first receiver coil opposite from the transmitter coil. In further implementations of the invention, if multiple additional receiver coils are employed, then the additional receiver coils may be placed between second receiver coil 511 and the upper coupling 517 with a similar extension chassis being utilized. Use of two receiver coils allows focused conductivity data to be received as disclosed in U.S. Provisional application Ser. No. 62/942, 360 filed 2 Dec. 2019 entitled "Magnetic susceptibility and conductivity module" forming the priority document for a PCT application.

Figure 16:
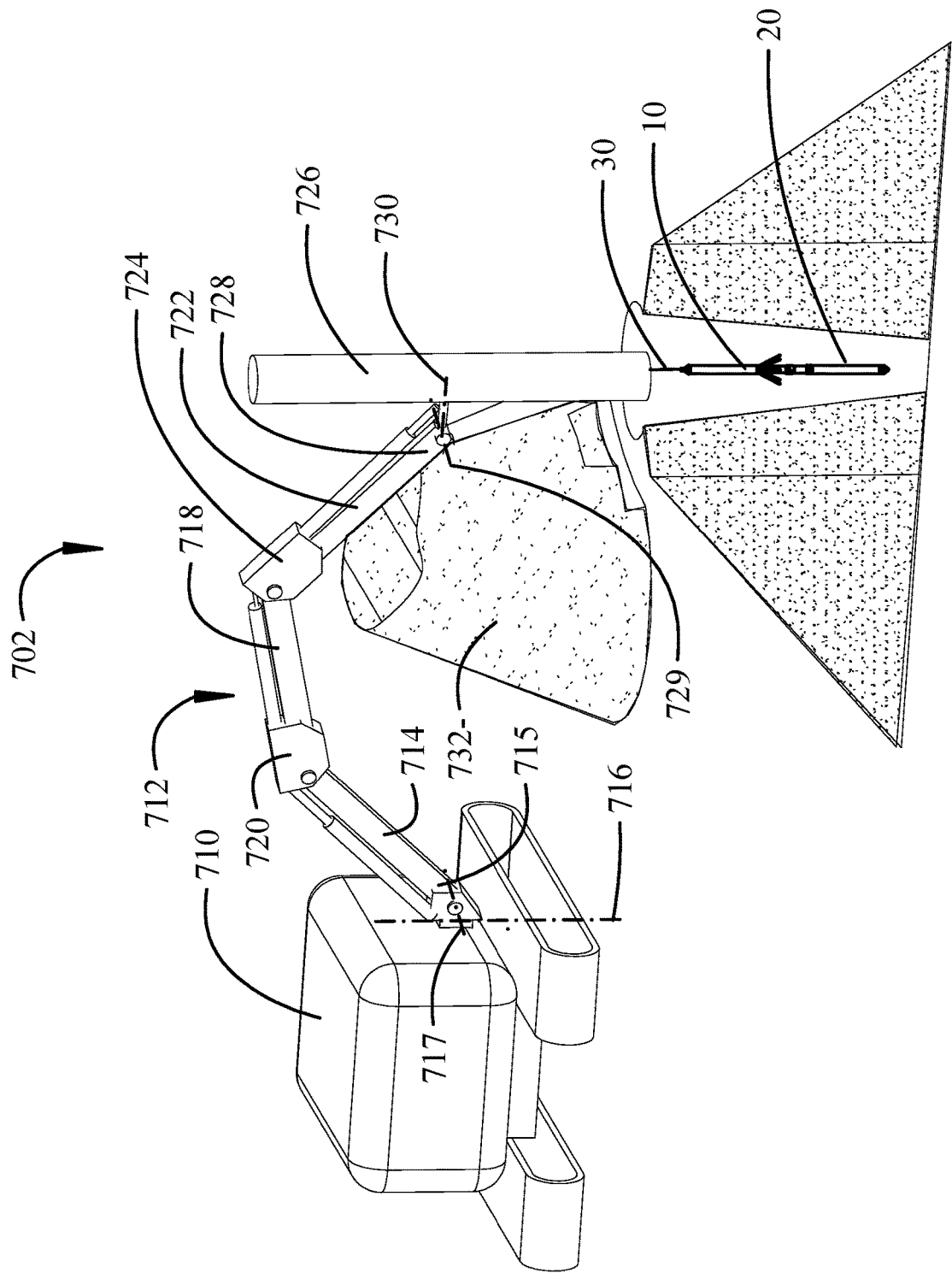

FIG. 16 discloses an example implementation of a deployment system 702 for the drill hole logging tool 10. An autonomous tracked or wheeled vehicle 710 incorporates a multi-segmented articulating arm 712 having a first segment 714 engaged at a proximal end 715 to the vehicle 710 for rotational motion about a vertical axis 716 and includes a pivot for rotation of the first section about a lateral axis 717. At least a second segment 718 is pivotally attached with a hinged fitting 720 to the first segment distal from the proximal end. In the example implementation, a third segment 722 is pivotally attached to the second segment with a second hinged fitting 724. A tool canister 726 is attached to a distal end 728 of the third segment for pivotal motion about a second lateral axis 729 and rotational motion about a longitudinal axis 730. The tool canister 726 houses deployment rigging for the wireline 30 and drill hole logging tool 10 and is maneuverable by the articulating arm 712 for extension over tailings 732 from the drill hole 20 to align the canister with the drill hole. The drill hole logging tool 10 is protected inside the canister during maneuvering and is then extended into and retracted from the drill hole 20 to conduct measurements.

Employing the autonomous vehicle 710, the drill hole logging tool 10 may be rapidly positioned, deployed into a drill hole and retracted at rates of between about 5-30 m/minute, preferably between about 8-25 m/minute and preferably 10-20 m/minute. In practice logging of the bore hole by the autonomous vehicle is carried out by the autonomous vehicle being remotely controlled to move to the drill hole. As the distance between the drill holes across the bench may be nominally spaced between 2-10 m intervals across the bench, then the vehicle can nominally move to position in about 2 minutes, the vehicle can then position the canister above the bore hole taking about a 1 minute, then deploy the logging tool and then bring it back uphole logging the bore hole on the run down and then on the run back uphole. This logging of the drill hole workflow can add on 5 minutes or less for a 30 m deep drill hole when deployment is a rate of 30 m/minute and even at the slower rate of 10 m/minute this same workflow can be completed in 10 minutes or less.

Having now described various implementations in detail as required by the patent statutes, those skilled in the art will recognize modifications and substitutions to the specific implementations disclosed herein. Such modifications are within the scope and intent of the present invention as defined in the following claims.

What is claimed is:

1. A reduced length modular drill hole logging tool for use in the geological identification of requirements of a drill hole comprising:
   a tool head;
   a diameter and profile measurement system connected to the tool head, with a plurality of radially extendible and retractable caliper arms positioned about the system;
   a gamma radiation detection system at least partially nested under the caliper arms, when retracted, of the diameter and profile measurement system;
   one or more additional removable modules of geological data collecting sensors supported in a case configured to be received in the drill hole; and
   a control module that communicates with the one or more modules and collects the geological data from the sensors, wherein said control module is housed within said tool head.

2. The modular drill hole logging tool as defined in claim 1 wherein the one or more additional removable modules comprise:
   a water/mud sensor assembly engaged downwardly from the diameter and profile measuring system;
   a temperature probe; and,
   a magnetic susceptibility and conductivity system mounted intermediate the water/mud sensor assembly and the diameter and profile measuring system.

3. The modular drill hole logging tool as defined in claim 2 further wherein the control module provides one or more of a power bus and a Controlled Area Network (CAN) communication bus distributed to the gamma radiation detection system, diameter and profile system and the magnetic susceptibility and conductivity system.

4. The modular drill hole logging tool as defined in claim 2 wherein the magnetic susceptibility and conductivity system is configured to provide focused conductivity measurement.

5. The modular drill hole logging tool as defined in claim 4 wherein the magnetic susceptibility and conductivity system comprises:
   a transmitter coil;
   a first receiver coil; and
   a second receiver coil mounted to an extension chassis extending from the first receiver coil oppositely from the transmitter coil; said first and second receiver coils adapted to provide focused conductivity measurement.

6. The modular drill hole logging tool as defined in claim 1 wherein each of the caliper arms are independently rotatably extendible.

7. The modular drill hole logging tool as defined in claim 6 wherein the plurality of caliper arms are configured for contact in a drill hole having a diameter of between 15 to 40 cm.

8. The modular drill hole logging tool as defined in claim 1 wherein the gamma radiation detection system comprises a gamma ray detector connected to a photomultiplier tube and the photomultiplier tube is nested beneath the plurality of caliper arms in the diameter and profile measurement system.

9. The modular drill hole logging tool as defined in claim 1 wherein each of the plurality of caliper arms are interchangeable or telescopic to provide different lengths, said lengths configured to allow the greatest range of angular motion of the arm while maintaining contact with a drill hole wall.

10. The modular drill hole logging tool as defined in claim 1 wherein each of the plurality of caliper arms is 5 to 15 cm in operable length.

11. The modular drill hole logging tool as defined in claim 1 wherein each of the plurality of caliper arms is independently operable to accommodate and record differing relative radius around a circumference of the drill hole.

12. The modular drill hole logging tool as defined in claim 1 wherein each of the plurality of caliper arms includes a tip sensor.

13. The modular drill hole logging tool as defined in claim 12 wherein the angular displacement measurement assembly comprises:
 a pushrod configured to engage a respective one of the plurality of caliper arms;
 a spring, said spring providing a force through the pushrod moving the respective one of the plurality of caliper arms outward until it contacts a drill hole wall.

14. The modular drill hole logging tool as defined in claim 13 further comprising:
 a caliper control processor providing a control signal to an AC current generator driving a primary coil in a linear variable displacement transducer (LVDT);
 secondary coils providing an induced output voltage to a detector (329) providing an output signal to an A/D converter for position of the LVDT.

15. The modular drill hole logging tool as defined in claim 1 and further comprising a deployment assembly, the deployment assembly comprising:
 a lift flange;
 a lead screw adapted to laterally move the lift flange; and
 a motor configured to rotate the lead screw; whereby when deployed, the lift flange moves in a first direction allowing each caliper arm to move away from the caliper body.

16. A drill hole logging system for measurement of one or more geological parameters of a drill hole comprising:
 an autonomous tracked or wheeled vehicle incorporating an articulating arm;
 a tool canister attached to a distal end of the articulating arm, the tool canister housing deployment rigging for a wireline and drill hole logging tool according to claim 1, said tool canister maneuverable by the articulating arm for extension to align the canister with the drill hole, the drill hole logging tool protected inside the canister during maneuvering and then extended into and retracted from the drill hole to conduct measurements.

17. The drill hole logging system as defined in claim 16 wherein the articulating arm comprises:
 a first segment engaged at a proximal end to the vehicle and configured for rotational motion about a vertical axis and including a pivot for rotation of the first segment about a lateral axis; and
 at least a second segment pivotally attached with a hinged fitting to the first segment distal from the proximal end.

18. The drill hole logging system as defined in claim 16 wherein
 the vehicle is configured to be rapidly position, deploy into a drill hole and retract the drill hole logging tool with rates of 5-30 m/minute and
 the autonomous vehicle is further configured for transition between drill holes spaced at 10 m in less than 2 minutes and canister positioning at less than 1 minute, whereby a workflow for a 30 m depth of a drill hole adds less than 5 minutes.

19. A drill hole caliper and spectral gamma apparatus comprising:
 a diameter and profile measurement system having two or more independent caliper arms extendible from a tool body;
 a photomultiplier tube positioned in the tool body concentrically recessed under the caliper arms; and
 a gamma ray detector positioned in the tool body downwardly from the caliper arms and connected to the photomultiplier tube.

20. The drill hole caliper and spectral gamma apparatus of claim 19 wherein the caliper arms are constructed of tubing.

* * * * *